US010296881B2

(12) United States Patent
Yan et al.

(10) Patent No.: US 10,296,881 B2
(45) Date of Patent: May 21, 2019

(54) CONTENT PROVIDER CHARGED GATEWAY (71) Applicant: Verizon Patent and Licensing Inc., Arlington, VA (US)

(72) Inventors: Lixia Yan, Bedminster, NJ (US); Barry Hoffner, Bridgewater, NJ (US); Ravikumar Pattabiraman, Hillsborough, NJ (US); Ho Yin Cheuk, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 778 days.

(21) Appl. No.: 14/297,295

(22) Filed: Jun. 5, 2014

(65) Prior Publication Data
US 2015/0356534 A1 Dec. 10, 2015

(51) Int. Cl.
*G06Q 20/14* (2012.01)
*H04L 12/14* (2006.01)
*G06Q 20/02* (2012.01)
*G06Q 20/12* (2012.01)
*H04W 4/24* (2018.01)
*H04M 15/00* (2006.01)

(52) U.S. Cl.
CPC ......... *G06Q 20/145* (2013.01); *G06Q 20/027* (2013.01); *G06Q 20/123* (2013.01); *H04L 12/1475* (2013.01); *H04M 15/09* (2013.01); *H04M 15/8083* (2013.01); *H04M 15/8214* (2013.01); *H04W 4/24* (2013.01); *H04L 12/1407* (2013.01); *H04L 12/1435* (2013.01); *H04M 15/8088* (2013.01)

(58) Field of Classification Search
None
See application file for complete search history.

(56) References Cited

U.S. PATENT DOCUMENTS

| 5,596,624 | A | * | 1/1997 | Armbruster | ........ | H04B 7/18567 |
| | | | | | | 379/219 |
| 5,835,720 | A | * | 11/1998 | Nelson | .............. | H04L 29/12009 |
| | | | | | | 709/224 |
| 6,792,461 | B1 | * | 9/2004 | Hericourt | ................ | H04L 29/06 |
| | | | | | | 370/230 |
| 6,822,955 | B1 | * | 11/2004 | Brothers | ........... | H04L 29/12018 |
| | | | | | | 370/389 |

(Continued)

*Primary Examiner* — Steven S Kim
*Assistant Examiner* — Timothy Paul Sax (57) ABSTRACT Systems and methods for providing content provider charged web content to a mobile device are disclosed. A mobile routing server receives a request for a mobile device to access web content associated with a content provider. The mobile routing server determines whether the request is associated with a provider-charged gateway. If the request is associated with the provider-charged gateway, the mobile routing server provides access to the web content via the provider-charged gateway and signals a billing server to charge an account associated with the content provider for data charges associated with the access to the web content. If the request is not associated with the provider-charged gateway, the mobile routing server provides access to the web content via a regular Internet gateway and signals the billing server to charge an account associated with the mobile device for the data charges associated with the access to the web content.

14 Claims, 3 Drawing Sheets

(56) References Cited

U.S. PATENT DOCUMENTS

| | | | | |
|---|---|---|---|---|
| 7,124,102 | B2* | 10/2006 | Aune | G06Q 20/3674 |
| | | | | 705/35 |
| 7,184,765 | B1* | 2/2007 | Birnie | H04W 4/24 |
| | | | | 455/432.3 |
| 7,353,541 | B1* | 4/2008 | Ishibashi | G06F 21/10 |
| | | | | 348/E7.056 |
| 9,275,405 | B1* | 3/2016 | Delker | G06Q 30/04 |
| 2001/0052052 | A1* | 12/2001 | Peng | H04L 41/00 |
| | | | | 711/133 |
| 2002/0062467 | A1* | 5/2002 | Hunzinger | H04L 1/1809 |
| | | | | 714/749 |
| 2006/0052113 | A1* | 3/2006 | Ophir | H04W 8/02 |
| | | | | 455/456.1 |
| 2006/0206586 | A1* | 9/2006 | Ling | H04L 29/12113 |
| | | | | 709/219 |
| 2007/0021113 | A1* | 1/2007 | Hamasaki | H04W 24/00 |
| | | | | 455/422.1 |
| 2007/0266432 | A1* | 11/2007 | Hara | H04L 12/4633 |
| | | | | 726/15 |
| 2010/0131393 | A1* | 5/2010 | Pattabiraman | G06Q 30/02 |
| | | | | 705/30 |
| 2011/0060632 | A1* | 3/2011 | Sivalingam | G06Q 10/10 |
| | | | | 705/14.16 |
| 2011/0131338 | A1* | 6/2011 | Hu | H04W 76/11 |
| | | | | 709/229 |
| 2012/0258691 | A1* | 10/2012 | Baer | G06F 3/0481 |
| | | | | 455/412.2 |
| 2013/0046664 | A1* | 2/2013 | Kazerani | G06F 9/541 |
| | | | | 705/34 |
| 2013/0316703 | A1* | 11/2013 | Girard | G06Q 20/145 |
| | | | | 455/432.1 |
| 2015/0195752 | A1* | 7/2015 | Trang | H04W 76/25 |
| | | | | 370/331 |

* cited by examiner

CONTENT PROVIDER CHARGED GATEWAY

BACKGROUND

A business may wish to encourage customers to contact the business, for example, to make sales or provide customer support. In particular, the business may create a toll free telephone number, which allows a customer to call the business without paying for long distance charges. Instead, the long distance charges are paid by the business. However, oftentimes, customers access business information via mobile devices. For example, the customer may access an online banking application or an online shopping application using a mobile device. To access web content on a mobile device, the customer purchases a data package (e.g., 2 gigabytes per month) or pays for each unit of data accessed (e.g., $0.01 per megabyte). This may discourage customers from accessing business services using their mobile devices, due to the customers' desire to save money, reducing business profitability. For example, a customer may avoid accessing an online bookstore using his/her mobile device, opting to purchase his/her books at a local bookstore instead. A customer may avoid accessing an online video rental service when outside of a WiFi network, to avoid mobile data charges, possibly causing the customer to be less engaged with the online video rental service and to consider terminating his/her subscription. As the foregoing illustrates, an approach for encouraging customers to access business web content using their mobile devices may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides, among other things, a content provider charged Internet gateway in a mobile network. The gateway may be an Access Point Name (APN). Alternatively, the gateway may be any other router or proxy server that routes between networks. Using the techniques described herein, a business may create an "800 APN" to provide customer(s) with free or discounted access to the business' web content. In landline telephony in the United States, when a customer dials an 800 telephone number, the business receiving the call pays for the long distance charges, which would ordinarily be charged to the customer. Similarly, in the "800 APN" technique, when a customer uses a mobile device on a mobile network to access an "800 APN," the business receiving the web access pays for all or a portion of the data charges, which would ordinarily be charged to the customer. As a result, a customer may be more likely to access web services of a business having an "800 APN," giving the business a possible advantage over its competitors.

As used herein, a mobile device may include any device accessing a mobile network. The mobile network may be a cellular network. For example, a mobile device may be a mobile phone, a tablet computer configured to access a mobile network, or a laptop or desktop computer configured to access a mobile network. The laptop or desktop computer may access the mobile network, for example, using an internal mobile network interface of the laptop or desktop computer, using an external universal serial bus (USB) mobile network interface, or using a mobile phone coupled to the laptop or desktop computer via a USB or short-range radio (e.g., WiFi or Bluetooth®) connection.

Figure 1:
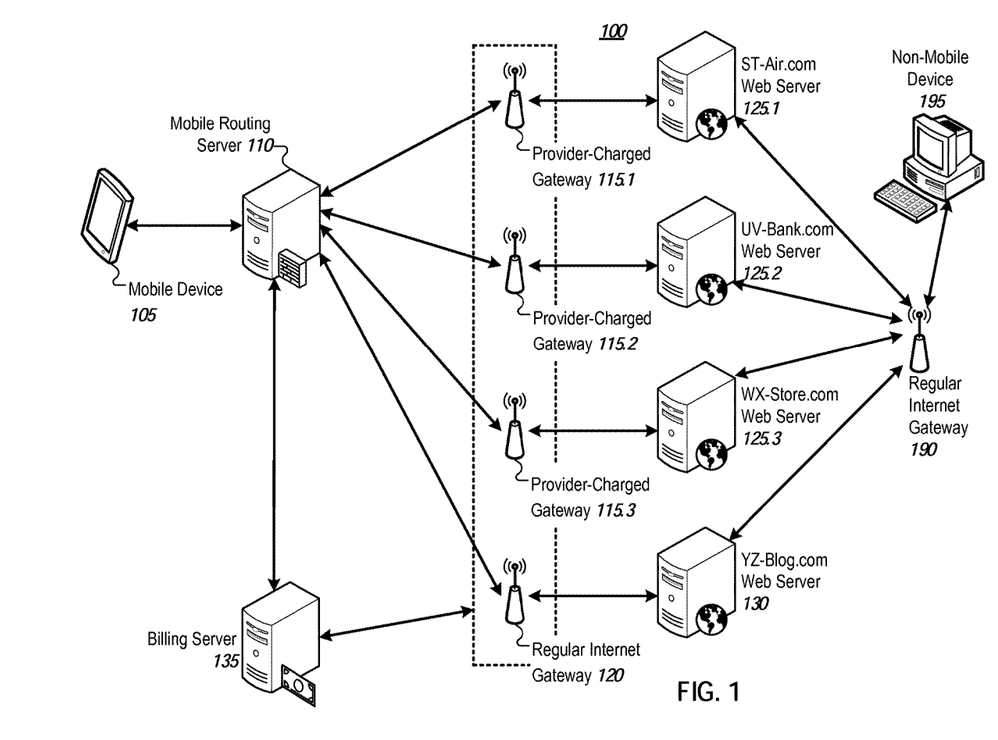
FIG. 1 illustrates an exemplary system for providing content provider charged web content to a mobile device.

FIG. 1 illustrates an exemplary system 100 for providing content provider charged web content to a mobile device. The system 100 may be implemented in a cellular network that supports multiple different gateways or APNs, for example, a 4G or Long Term Evolution (LTE) network. As shown, the system 100 includes a mobile device 105, a mobile routing server 110, provider-charged gateways 115.1-115.3 coupled with web servers 125.1-125.3, respectively, a regular Internet gateway 120 coupled with a web server 130, and a billing server 135. The provider-charged gateways 115.1-115.3 may correspond to "800 APNs," and the regular Internet gateway 120 may correspond to Internet APN supporting data network traffic that may be completely charged to the user of the mobile device. The system 100 also includes a non-mobile device 195, which accesses the web servers 125.1-125.3 and 130 via a regular Internet gateway 190. As used herein, the phrase "regular Internet gateway" may refer to a gateway through which access charges are billed to the customer accessing the data (e.g., the owner of the network-accessing device) and not to the content provider providing the data. In some cases, the gateways 115.1-115.3 and 120 are APNs.

The mobile device 105 may be any mobile device capable of accessing a mobile network, for example, a mobile phone, a tablet computer, or a laptop or desktop computer including an internal or external mobile network interface. The mobile routing server 110 and the billing server 135 are associated with a mobile operator that controls the gateways 115.1-115.3 and 120. The web servers 125.1-125.3 and 130 store web content, which may be accessed via the mobile device 105. The web content may include webpage(s) or page(s) within applications.

According to some implementations, the mobile routing server 110 receives, from the mobile device 105, a request to access web content associated with a content provider. For example, the request may be a request to view a webpage associated with a URL, such as ST-Air.com, UV-Bank.com, WX-Store.com or YZ-Blog.com. The mobile routing server 110 determines, based on metadata of the request, whether the request is associated with a provider charged gateway 115.1-115.3. The metadata of the request may include a Uniform Resource Indicator (URI) of the request or a destination Internet Protocol (IP) address of the request. As illustrated in FIG. 1, the URIs ST-Air.com, UV-Bank.com, and WX-Store.com are associated with provider-charged gateways 115.1-115.3, while other URLs, such as YZ-Blog.com, may not be associated with provider-charged gateways 115.1-115.3. The mobile routing server 110 may store a set of URI(s) or IP address(es) associated with provider charged gateways 115.1-115.3 and determine, based on this set of URI(s) or IP address(es) and the requested URI or IP address, whether the request is associated with the provider charged gateway 115.1-115.3. The set of URI(s) or IP address(es) associated with the provider charged gateways 115.1-115.3 may be stored at the mobile routing server 110 in a table or in any other format. The mobile routing server 110 determines whether the mobile device 105 is accessing the mobile routing server 110 via a non-roaming mobile network based on whether an identified mobile operator of the mobile device 105 is equivalent to or based in the same country as a mobile operator whose mobile network the mobile device is accessing. For example, the mobile device 105 that is associated with a mobile operator in the United States (e.g., AT&T®) may be considered to be roaming if the mobile device 105 is accessing a mobile network of a mobile operator outside the United States (e.g., the Canadian mobile operator Rogers®) or non-roaming if the mobile device 105 is accessing the mobile network of the mobile operator (e.g., AT&T®) in the United States. If the mobile device 105 is accessing a mobile network of a different operator (e.g., T-Mobile®) in the United States, the mobile device 105 may be considered either roaming or non-roaming, depending on the policies of the mobile operator and the contract of the user of the mobile device with the mobile operator. In some cases, the provider charged gateways 115.1-115.3 may be available only when other conditions, in addition to or in place of those listed above, are met. The conditions may be based on time (e.g., between 9 AM and 9 PM on business days), geographic location (e.g., located in one's home state or in the state of Connecticut), network usage level (e.g., the user's prepays for at least 1 GB of network access per month), etc.

A content provider, for example ST-Air.com, may register for using the provider-charged gateway 115.1 in order to encourage its customers to access its services using the mobile network or to attract new customers. The registration may be completed by a representative (e.g., business manager or network manager) of ST-Air.com. During the registration process, the representative of ST-Air may access a webpage for registering or call a toll free telephone number for registering. During the access to the webpage (e.g., within the webpage's user interface) or the toll free call, the representative may indicate a billing policy for splitting the data charges for accessing the web content of the ST-Air.com web server 125.1 between an account associated with the content provider and an account associated with the mobile device 105 accessing the web content of the ST-Air.com web server 125. For example, the billing policy may be the content provider pays for all data charges, the content provider pays for a fixed percentage (e.g., 50% or 90%) of data charges, the content provider pays only for the first n kilobytes per day of data, the content provider pays completely for the first n kilobytes per day of data and then a fixed percentage of data charges, etc. In some cases, the billing policy may depend on the customer's relationship with the content provider (e.g., bronze, silver, or gold level with an airline, hotel chain, insurance company, coffee shop, etc.) or on the customer's relationship with the mobile operator (e.g., whether the customer purchases at least 0.75 GB of data per month, whether the customer has an annual service contract, etc.). When accessing the web content over the mobile network, the mobile device 105 may be notified of the billing policy.

If the request is associated with one of the provider-charged gateways 115.1-115.3 and the mobile device 105 is accessing the mobile routing server 110 via the non-roaming mobile network, the mobile routing server 110 provides, to the mobile device 105, access to the web content via the provider-charged gateway 115.1-115.3. The mobile routing server 110 is thus is able to select between the provider-charged gateway 115.1-115.3 and the regular Internet gateway 120. The mobile routing server 110 may inform the billing server 135 that the provider charged gateway(s) 115.1-115.3 are used to access the content for the mobile device 105. The billing server 135 may consequently charge the account associated with the content provider for at least a portion of the data charges associated with the access to the web content, as specified by the content provider's billing policy. The remaining data charges, if any, may be charged to the account associated with the mobile device 105.

If the request is not associated with one of the provider-charged gateway 115.1.-115.3 or the mobile device 105 is accessing the mobile routing server 110 via a roaming mobile network, access to the web content may be provided via the regular Internet gateway 120. The mobile routing server 110 may inform the billing server 135 that the regular Internet gateway 120 is to be used to access the content for the mobile device 105. The billing server 135 may charge an account associated with the mobile device 105 for the data charges associated with the access to the web content. The account associated with the content provider is not charged, as the user accesses the regular Internet gateway 120, not the provider-charged gateway 115.1-115.3, and the content provider has not agreed to pay for the user's data charges. If the mobile device 105 is roaming and attempting to access web content associated with a provider-charged gateway 115.1-115.3, the mobile device 105 may be provided a notification that provider-charged network access is not available while roaming. The user of the mobile device may be provided with options either to continue with the network access request and be charged for the accessed data, or to cancel the request. As a result, the user may not be unexpectedly charged for roaming data. If the user is not being charged for the data access (e.g., when not roaming) or being charged a reduced rate for the data access the user may be provided with a notification that the user is not being charged for the data access or being charged a reduced rate for the data access. The notification to the user may include a push notification, a message received via short messaging service (SMS), or a pop-up in a web browsers or another application.

The billing server 135 may charge the account associated with the content provider or the account associated with the mobile device 105 based on an amount of data (e.g. a number of kilobytes) provided to the mobile device 105. The mobile routing server 110 may measure the amount of data associated with the provider-charged gateway 115.1-115.3 or associated with the regular Internet gateway 120 and forward this information to the billing server 135. Alternatively, the amount of data accessed may be measured at the gateways 115.1-115.3 and 120, and forwarded from the gateways 115.1-115.3 and 120 to the billing server 135. The billing server 135 may then charge the account associated with the content provider or the account associated with the user of the mobile device for the access to the web content based on the measured amount of data accessed.

As described above, the provider-charged gateways 115.1-115.3 may not be available to roaming users as roaming data is typically more expensive than non-roaming data. For example, roaming data may cost $0.25 per megabyte while non-roaming data may cost $0.01 per megabyte. In some cases, a content provider may not wish to pay the more expensive roaming data charges for roaming users who attempt to access its content.

Alternatively, in some cases, a content provider may indicate that the content provider wishes to pay for roaming users to access its content. In such cases, the associated web content may be provided to roaming mobile devices and the data charges for the roaming mobile devices to access the web content may be fully or partially assigned to the content provider, as described herein. For example, an application that looks up a local emergency telephone number and dials the number (e.g., 911 in the United States or 112 in Europe) may indicate that the application developer wishes to pay for roaming users' data charges, so that users can determine and access their local emergency telephone number without worrying about data roaming charges. Similarly, a bank application for reporting a stolen credit card may indicate that the bank wishes to pay for roaming users' data charges so that users can report stolen credit cards more quickly and unauthorized charges can be avoided. In some cases, additional functionality may be provided to users who meet certain requirements. For example, a bank may provide free or subsidized roaming access to its online banking service for routine online banking transaction (e.g., paying bills, reviewing statements, checking balances, etc.) to users who meet certain requirements (e.g., have a platinum account, have a balance of at least $20,000, etc.). In these cases, limited functionality of the application may be enabled as free or reduced, with this information being provided via notification to the user. The notification to the user may include a push notification, a message received via SMS, or a pop-up in a web browsers or another application.

In some cases, a content provider may indicate that the content provider wishes to pay for roaming users to access its content in some but not all locations. For example, a hotel company with hotels in the United States, Canada, and Mexico may pay for users, based in the United States, to access content on its webpage or mobile application when the users are roaming in Canada or Mexico, but not when the users are roaming in countries where the hotel company lacks hotels. In some examples, a content provider may pay for roaming users to access its content during some times but not others. For example, a ski resort in Canada may pay roaming charges for users to access its webpage if the users are roaming in Canada in the winter, but not if the users are roaming in Canada in the summer or in other countries at any time. Using these techniques, content providers may subsidize some network traffic but not other network traffic, leading network traffic that is most likely to generate revenue for the content provider to its webpage or mobile application.

As shown in FIG. 1, the non-mobile device 195 may access the content of the web servers 125.1-125.3 and 130 via the non-mobile regular Internet gateway 190, and not via the mobile routing server 110. The non-mobile device 195 may be any device accessing the Internet via the non-mobile regular Internet gateway 190, for example, a laptop computer, a desktop computer, a tablet computer, or a mobile phone connected to an Ethernet or a WiFi network. The non-mobile regular Internet gateway 190 may be associated with a non-mobile network, for example, a cable network, a dial-up network, or a fiber optic network for providing residential or commercial wired or short-range wireless (e.g., WiFi) Internet access. An account associated with the non-mobile device 195 may have unlimited Internet access for a fixed fee (e.g., $70 per month) or may be charged for accessing content via the non-mobile regular Internet gateway 190.

As illustrated in FIG. 1, each provider (ST-Air.com, UV-Bank.com, and WX-store.com) has its own provider-charged gateway 115.1-115.3. However, in alternative implementations, two or more providers may share a common provider-charged gateway. For example, a single provider-charged gateway 115.1 may be used to access both the web server 125.1 of ST-Air.com and the web server 125.2 of UV-Bank.com. In some examples, multiple provider-charged gateways may link to the web server of the same provider. For example, both provider-charged gateways 115.1 and 115.2 may link to the web server 125.2 of UV-Bank.com.

FIG. 1 illustrates one example of a system in which examples of the subject technology may be implemented. However, variations on the structure of the system 100 illustrated in FIG. 1 are possible. In some cases, the subject technology may be implemented without the mobile routing server 110, and the logic for determining which gateway 115.1-115.3 or 120 may reside in the mobile device 105. In some cases, a single device, which may be called a packet gateway (PGW), may include both the routing server 110 and the gateways 115.1-115.3 and 120, and the gateways 115.1-115.3 and 120 may correspond to packet data networks (PDNs). In some other cases, communications may travel from the mobile device 105 to the gateways 115.1-115.3 or 120 and then to the mobile routing server 110, and the mobile routing server may route the communications to the appropriate web server 125.1-125.3 or 130.

As discussed above, the determination whether the mobile device 105 is permitted to access the provider-charged gateway 115.1-115.3 is made at the mobile routing server 110. However, in some implementations, this determination may be made at the mobile device by an application executing at the mobile device. For example, the mobile device 105 may include a mobile banking application for UV-Bank.com, which determines whether the mobile device 105 should use the provider-charged gateway 115.2 or the regular Internet gateway 120 for accessing the UV-Bank.com web server 125.2. The mobile banking application at the mobile device 105 may make this determination using any of the criteria specified herein. The determination may be made based on code in the mobile banking application.

In some cases, when a content provider (e.g., UV-Bank.com) registers with the mobile operator to create a provider-charged gateway, the mobile operator may provide, to the content provider, an application programming interface (API) for accessing the provider-charged gateway. The content provider may then create a mobile application for accessing the content provider's web server. The mobile application may include code that determines, based on any of the criteria described herein, whether the provider-charged gateway or the regular Internet gateway should be used to access the content provider's web server. It should be noted that the mobile application, and the code that determines whether the provider-charged gateway or the regular Internet gateway should be used may reside on the mobile device 105. Thus, in these implementations, a mobile routing server 110 may not be needed. Some mobile devices (e.g., mobile devices last updated before the subject technology was implemented) may not be programmed to support the provider-charged gateway 115.1-115.3 and, thus, may always rely on the regular Internet gateway 120 to access all content.

Figure 2:
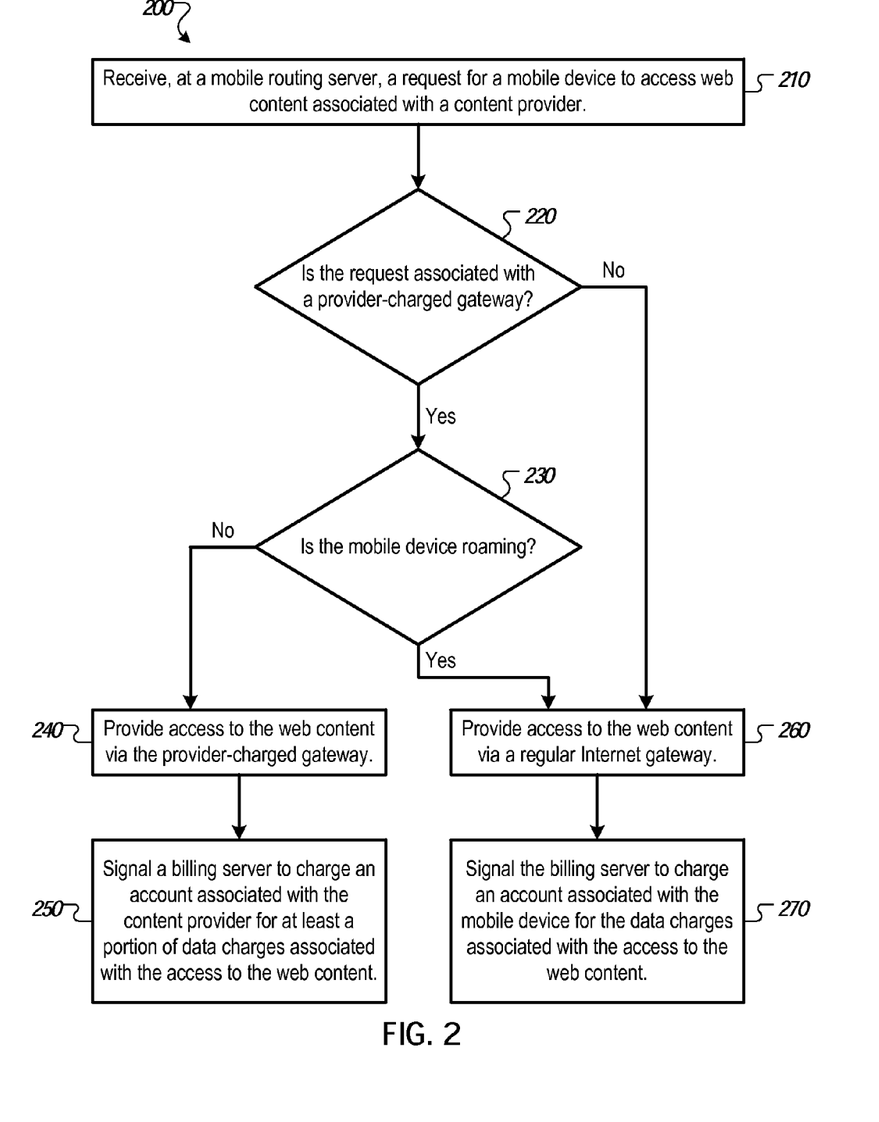
FIG. 2 illustrates an exemplary process for providing content provider charged web content to a mobile device.

FIG. 2 illustrates an exemplary process 200 for providing content provider charged web content to a mobile device. The process 200 begins at step 210, where a mobile routing server (e.g., mobile routing server 110) receives a request for a mobile device (e.g., mobile device 105) to access web content associated with a content provider. The request may be received by the user entering a uniform resource locator (URL) address or selecting a link in a web browser of the mobile device or the user requesting to access content in a mobile network via an application of the mobile device. For example, the mobile device may request to access the webpage XYZ.com associated with the content provider XYZ.

In step 220, the mobile routing server determines whether the request is associated with a provider-charged gateway. The provider-charged gateway may be a provider-charged APN or an "800 APN." The mobile routing server may store a set of URI(s) or IP address(es) that are associated with provider-charged gateway(s) and determine whether the received request corresponds to a URI or IP address in the stored set. If the request is associated with the provider-charged gateway, the process 200 continues to step 230. If the request is not associated with the provider-charged gateway, the process 200 continues to step 360.

In step 230, if the request is associated with the provider-charged gateway, the mobile routing server determines whether the mobile device is roaming. As discussed above, whether the mobile device is roaming may be determined based on a geographic location of the mobile device or based on a mobile operator providing network access to the mobile device. If the mobile device is not roaming, the process 200 continues to step 240. If the mobile device is roaming, the process 200 continues to step 360.

In step 240, if the request is associated with the provider-charged gateway and the mobile device is not roaming, the mobile routing server provides access to the web content via the provider-charged gateway. Using the provider-charged gateway, all or a portion of the data charges for accessing the web content may be billed to the content provider rather than to the user of the mobile device. As a result, the user of the mobile device may have free or discounted data access and mobile network user(s) may be encouraged to access the content provider's webpage or mobile application and, thereby, to do business with the content provider. In some use cases of the provider-charged gateway, to prevent the content provider for paying for access to data that does not belong to the content provider, the mobile routing server may verify, based on a signature of the web content provided to the mobile device, that the web content is associated with the content provider. The signature may be used to authenticate the content as coming from a specific content provider. For example, the signature may include a public key of the content provider. Data that does not belong to a content provider may be accessed through the content provider, for example, due to bugs or errors in the content provider's application or webpage or due to an application for accessing other data (e.g., a browser) running within the content provider's application. For example, a social networking application may include a browser within the social networking application to allow a user to view links to external webpages provided by the user's social contacts. The social networking application may subsidize data access to content within the social networking application itself, but not data access to the external webpages.

In step 250, the mobile routing server signals a billing server (e.g., billing server 135) to charge an account associated with the content provider for at least a portion of the data charges associated with the access to the web content. Depending on settings provided by the content provider when registering for the provider-charged gateway, the content provider may be charged for all of the data charges or for a preset (by the content provider) portion of the charges. After step 250, the process 200 ends.

In step 260, if the request is not associated with the provider-charged gateway or the mobile device is roaming, the mobile routing server provides access to the web content via a regular Internet gateway. The regular Internet gateway is different from the provider-charged gateway. The regular Internet gateway may be a regular Internet APN. Data charges for using the regular Internet gateway are billed entirely to the account associated with the mobile device and not to the content provider.

In step 270, the mobile routing server signals the billing server to charge the account associated with the mobile device for the data charges associated with the access to the web content. The data charges may include regular data access charges or roaming charges if the mobile device is roaming. After step 270, the process 200 ends.

As set forth above, the steps 210-270 of the process 200 are carried out according to a specified order. However, the steps may be carried out in any order, not necessarily the one specified above. In some examples, one or more of the steps 210-270 may be skipped.

Figure 3:
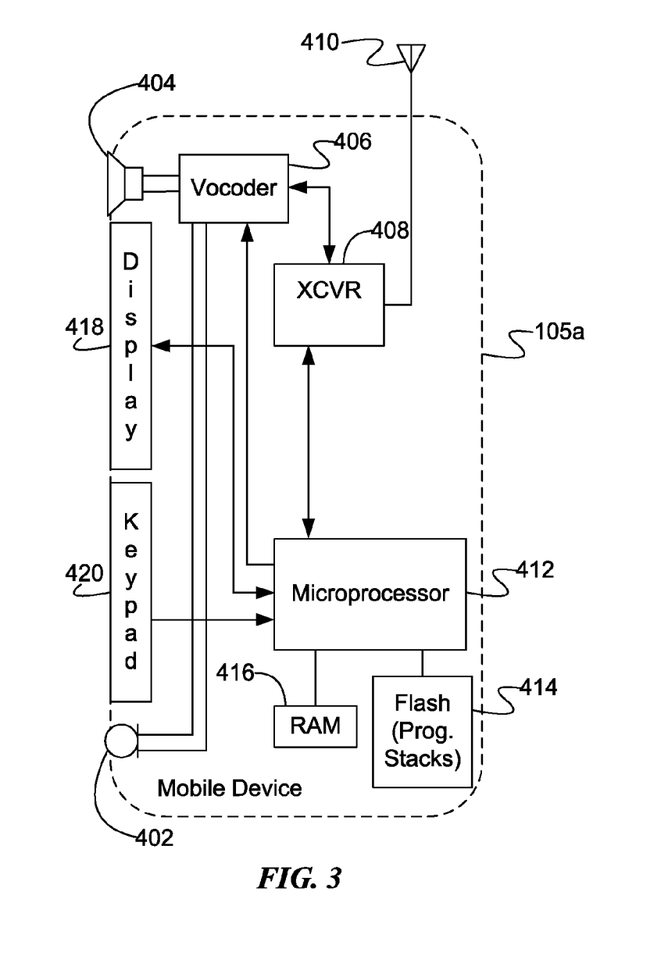
FIG. 3 is a high-level functional block diagram of an exemplary non-touch type mobile device which may access content provider charged web content.

FIG. 3 provides a block diagram illustration of an exemplary non-touch type mobile device 105a, which may correspond to the mobile device 105 of FIG. 1. Although the mobile device 105a may be a smart-phone or may be incorporated into another device, such as a personal digital assistant (PDA) or the like, for discussion purposes, the illustration shows the mobile device 105a is in the form of a handset. The handset embodiment of the mobile device 105a functions as a normal digital wireless telephone station. For that function, the mobile device 105a includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile device 105a also includes at least one digital transceiver (XCVR) 408. The mobile device 105a may be configured for digital wireless communications using one or more of the common network technology types. The concepts discussed here encompass embodiments of the mobile device utilizing any digital transceivers that conform to current or future developed digital wireless communication standards. The mobile device may also be capable of analog operation via a legacy network technology.

The transceiver 408 provides two-way wireless communication of information, such as vocoded speech samples and/or digital information, in accordance with the technology of the network 165. The transceiver 408 also sends and receives a variety of signaling messages in support of the various voice and data services provided via the mobile device 105a and the communication network. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

The mobile device 105a includes a display 418 for displaying messages, menus or the like, call related information dialed by the user, calling party numbers, etc. A keypad 420 enables dialing digits for voice and/or data calls as well as generating selection inputs, for example, as may be keyed-in by the user based on a displayed menu or as a cursor control and selection of a highlighted item on a displayed screen. The display 418 and keypad 420 are the physical elements providing a textual or graphical user interface. Various combinations of the keypad 420, display 418, microphone 402 and speaker 404 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 412 serves as a programmable controller for the mobile device 105a, in that it controls all operations of the mobile device 105a in accordance with programming that it executes, for all normal operations, including those under consideration here. In the example, the mobile device 105a includes flash type program memory 414, for storage of various "software" or "firmware" program routines and mobile configuration settings, such as mobile directory number (MDN) and/or mobile identification number (MIN), etc. The flash type program memory 414 stores programed instructions, including those described herein. The mobile device 105a may include a non-volatile random access memory (RAM) 416 for a working data processing memory. Of course, other storage devices or configurations may be added to or substituted for those in the example. In a present implementation, the flash type program memory 414 stores firmware such as a boot routine, device driver software, an operating system, call processing software and vocoder control software, and any of a wide variety of other applications, such as client browser software and short message service software. The memories 414, 416 also store various data, such as telephone numbers and server addresses, downloaded data such as multimedia content, and various data input by the user. Programming stored in the flash type program memory 414, sometimes referred to as "firmware," is loaded into and executed by the microprocessor 412.

Figure 4:
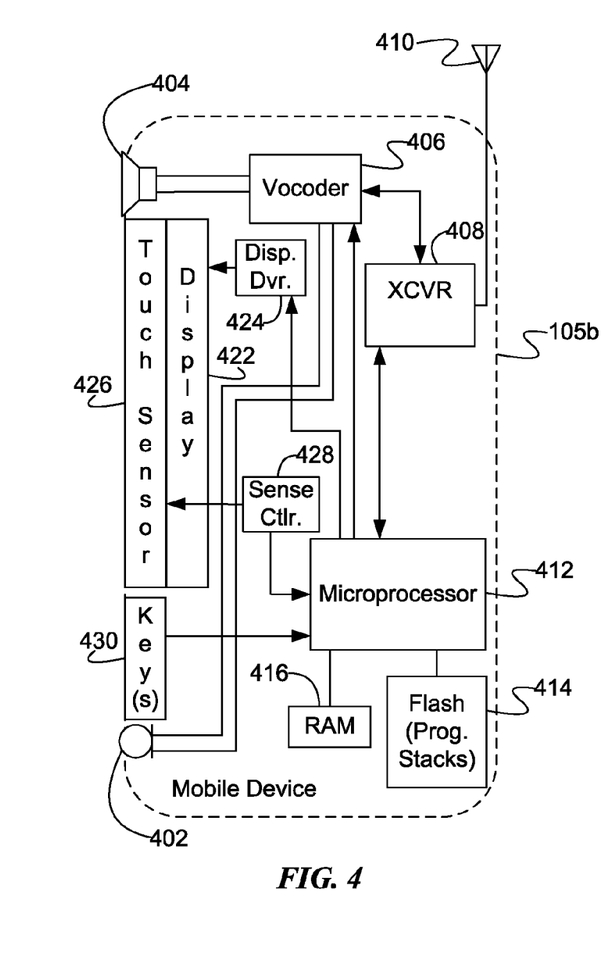
FIG. 4 is a high-level functional block diagram of an exemplary touch screen type mobile device which may access content provider charged web content.

For purposes of such a discussion, FIG. 4 provides a block diagram illustration of an exemplary touch screen type mobile device 105b. Although configured somewhat differently, at least logically, a number of the elements of the exemplary touch screen type mobile device 105b are similar to the elements of mobile device 105a, and are identified by like reference numbers in FIGS. 3 and 4. For example, the touch screen type mobile device 105b includes a microphone 402, speaker 404 and vocoder 406, for audio input and output functions, much like in the earlier example. The mobile device 105b also includes at least one digital transceiver (XCVR) 408, for digital wireless communications, although the mobile device 105b may include an additional digital or analog transceiver. The concepts discussed here encompass embodiments of the mobile device 105b utilizing any digital transceivers that conform to current or future developed digital wireless communication standards. As in the mobile device 105a, the transceiver 408 provides two-way wireless communication of information, such as vocoded speech samples and/or digital information, in accordance with the technology of the network 165. The transceiver 408 also sends and receives a variety of signaling messages in support of the various voice and data services provided via the mobile device 105b and the network 165. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

As in the example of the mobile device 105a, a microprocessor 412 serves as a programmable controller for the mobile device 105b, in that it controls all operations of the mobile device 105b in accordance with programming that it executes, for all normal operations, and for operations described herein. In the example, the mobile device 105b includes flash type program memory 414, for storage of various program routines and mobile configuration settings. The mobile device 105b may also include a non-volatile random access memory (RAM) 416 for a working data processing memory. Of course, other storage devices or configurations may be added to or substituted for those in the example. Hence, outlined above, the mobile device 105b includes a processor, and programming stored in the flash memory 414 configures the processor so that the mobile device is capable of performing various desired functions, including the functions described herein.

In the example of FIG. 4, the user interface elements included a display and a keypad. The mobile device 105b may have a limited number of key(s) 430, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile device 105b includes a display 422, which the microprocessor 412 controls via a display driver 424, to present visible outputs to the device user. The mobile device 105b also includes a touch/position sensor 426. The sensor 426 is relatively transparent, so that the user may view the information presented on the display 422. A sense circuit 428 sensing signals from elements of the touch/position sensor 426 and detects occurrence and position of each touch of the screen formed by the display 422 and sensor 426. The sense circuit 428 provides touch position information to the microprocessor 412, which can correlate that information to the information currently displayed via the display 422, to determine the nature of user input via the screen.

The display 422 and touch sensor 426 (and possibly one or more keys 430, if included) are the physical elements providing the textual and graphical user interface for the mobile device 105b. The microphone 402 and speaker 404 may be used as user interface elements for audio input and output.

The structure and operation of the mobile devices 105a and 105b, as outlined above, were described to by way of example, only.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a mobile routing server, a request from a mobile device operated by an end user,
the request being entered by way of a user interface of the mobile device,
the request being associated with a Uniform Resource Locator ("URL") for accessing web content provided by a content provider, and
the request including metadata that comprises at least one of a Uniform Resource Indicator ("URI") and a destination Internet Protocol ("IP") address;
determining, by the mobile routing server, that the mobile device is accessing the mobile routing server via a roaming mobile network;
determining, by the mobile routing server in response to determining that the mobile device is accessing the mobile routing server via the roaming mobile network, that the mobile device is in a first roaming location where the content provider has agreed to pay for at least a portion of roaming data charges associated with the access to the web content by the mobile device instead of a second roaming location where the content provider has not agreed to pay for the at least the portion of the roaming data charges associated with the access to the web content by the mobile device;
determining, by the mobile routing server, that the mobile device is accessing the mobile routing server via the roaming mobile network during a predetermined period of time in which the content provider has agreed to pay for the at least the portion of the roaming data charges associated with the access to the web content by the mobile device; and
determining, by the mobile routing server based on the mobile device being in the first roaming location and the mobile device accessing the mobile routing server via the roaming mobile network during the predetermined time period and based on the at least one of the URI and the destination IP address included in the metadata of the request, that the request is associated with a first gateway instead of a second gateway, the first gateway being a provider-charged gateway that is configured to provide access to the web content associated with the URL, the second gateway also being configured to provide access to the web content associated with the URL but not being a provider-charged gateway;
in response to determining that the request is associated with the first gateway:
instructing, by the mobile routing server, the mobile device to provide a notification to the end user that indicates that the at least the portion of the roaming data charges associated with the access of the web content by way of the mobile roaming network will be charged to an account associated with the content provider;
providing, by the mobile routing server, access to the web content associated with the URL via the first gateway; and
instructing, by the mobile routing server, a billing server to charge the account associated with the content provider for the at least the portion of the roaming data charges associated with the access to the web content by the mobile device that would have otherwise been charged to an account of the end user of the mobile device; and charging, by the billing server in response to the instructing of the billing server to charge the account associated with the content provider, the account associated with the content provider for the at least the portion of roaming data charges associated with the access to the web content instead of the account of the end user of the mobile device.

2. The method of claim 1, further comprising:

receiving, at the mobile routing server, an additional request from the mobile device,
  the additional request being entered by way of the user interface of the mobile device,
  the additional request being associated with an additional URL for accessing web content provided by an additional content provider, and
  the additional request including metadata that comprises at least one of an additional URI and an additional destination IP address;

determining, by the mobile routing server based on the at least one of the additional URI and the additional destination IP address included in the metadata of the additional request, that the additional request is not associated with the first gateway;

providing, by the mobile routing server in response to the determining that the additional request is not associated with the first gateway, access to the web content associated with the additional URL via the second gateway; and instructing, by the mobile routing server, the billing server to charge the account of the end user of the mobile device for data charges associated with the access to the web content associated with the additional URL, wherein:
  the first gateway includes a provider-charged Access Point Name (APN); and
  the second gateway includes a regular Internet gateway including a regular Internet APN different from the provider-charged APN.

3. The method of claim 1, further comprising receiving, from the content provider, a registration for using the provider-charged gateway, wherein the registration indicates a billing policy for splitting the roaming data charges between the account associated with the content provider and the account of the end user of the mobile device.

4. The method of claim 3, further comprising, in response to determining that the request is associated with the first gateway, providing, to the mobile device, a notification of the billing policy in advance of providing access to the web content.

5. The method of claim 1, further comprising, in response to determining that the request is associated with the first gateway, verifying, based on a signature of the web content, that the web content is associated with the content provider.

6. A non-transitory computer-readable medium comprising instructions which, when executed by a plurality of computing devices, cause each of the plurality of computing devices to perform one or more of the following operations:

receive a request from a mobile device operated by an end user,
  the request being entered by way of a user interface of the mobile device,
  the request being associated with a Uniform Resource Locator ("URL") for accessing web content provided by a content provider, and
  the request including metadata that comprises at least one of a Uniform Resource Indicator ("URI") and a destination Internet Protocol ("IP") address;

determine that the mobile device is accessing a mobile routing server via a roaming mobile network;

determine, in response to determining that the mobile device is accessing the mobile routing server via the roaming mobile network, that the mobile device is in a first roaming location where the content provider has agreed to pay for at least a portion of roaming data charges associated with the access to the web content by the mobile device instead of a second roaming location where the content provider has not agreed to pay for the at least the portion of the roaming data charges associated with the access to the web content by the mobile device;

determine that the mobile device is accessing the mobile routing server via the roaming mobile network during a predetermined period of time in which the content provider has agreed to pay for the at least the portion of the roaming data charges associated with the access to the web content by the mobile device; and determine, based on the mobile device being in the first roaming location and the mobile device accessing the mobile routing server via the roaming mobile network during the predetermined time period and based on the at least one of the URI and the destination IP address included in the metadata of the request, that the request is associated with a first gateway instead of a second gateway, the first gateway being a provider-charged gateway that is configured to provide access to the web content associated with the URL, the second gateway also being configured to provide access to the web content associated with the URL but not being a provider-charged gateway;

in response to determining that the request is associated with the first gateway:
  provide access to the web content associated with the URL via the first gateway; and
  charge the account associated with the content provider for the at least the portion of the roaming data charges associated with the access to the web content by the mobile device that would have otherwise been charged to an account of the end user of the mobile device.

7. The non-transitory computer-readable medium of claim 6, further comprising instructions which, when executed by the plurality of computing devices, cause each of the plurality of computing devices to perform one or more of the following operations:
  receive an additional request from the mobile device,
    the additional request being entered by way of the user interface of the mobile device,
    the additional request being associated with an additional URL for accessing web content provided by an additional content provider, and
    the additional request including metadata that comprises at least one of an additional URI and an additional destination IP address;
  determine, based on the at least one of the additional URI and the additional destination IP address included in the metadata of the additional request, that the additional request is not associated with the first gateway;
  provide, in response to the determining that the additional request is not associated with the first gateway, access to the web content associated with the additional URL via the second gateway; and
charge the account of the end user of the mobile device for data charges associated with the access to the web content associated with the additional URL,
wherein:
the first gateway includes a provider-charged Access Point Name (APN); and
the second gateway includes a regular Internet gateway including a regular Internet APN different from the provider-charged APN.

8. The non-transitory computer-readable medium of claim 6, further comprising instructions which, when executed by the plurality of computing devices, cause at least one of the plurality of computing devices to process a registration, received from the content provider, for using the provider-charged gateway, wherein the registration indicates a billing policy for splitting the roaming data charges between the account associated with the content provider and the account of the end user of the mobile device.

9. The non-transitory computer-readable medium of claim 8, further comprising instructions which, when executed by the plurality of computing devices, cause at least one of the plurality of computing devices to, provide, to the mobile device, a notification of the billing policy in advance of providing access to the web content.

10. The non-transitory computer-readable medium of claim 6, further comprising instructions which, when executed by the plurality of computing devices, cause at least one of the plurality of computing devices to verify, based on a signature of the web content, that the web content is associated with the content provider.

11. A system comprising:
a billing server; and
a mobile routing server comprising:
one or more processors; and
a memory comprising instructions which, when executed by the one or more processors, cause the one or more processors to:
receive, at the mobile routing server, a request from a mobile device operated by an end user,
the request being entered by way of a user interface of the mobile device,
the request being associated with a Uniform Resource Locator ("URL") for accessing web content provided by a content provider, and
the request including metadata that comprises at least one of a Uniform Resource Indicator ("URI") and a destination Internet Protocol ("IP") address;
determine that the mobile device is accessing the mobile routing server via a roaming mobile network;
determine, in response to determining that the mobile device is accessing the mobile routing server via the roaming mobile network, that the mobile device is in a first roaming location where the content provider has agreed to pay for at least a portion of roaming data charges associated with the access to the web content by the mobile device instead of a second roaming location where the content provider has not agreed to pay for the at least the portion of the roaming data charges associated with the access to the web content by the mobile device;
determine that the mobile device is accessing the mobile routing server via the roaming mobile network during a predetermined period of time in which the content provider has agreed to pay for the at least the portion of the roaming data charges associated with the access to the web content by the mobile device; and
determine, based on the mobile device being in the first roaming location and the mobile device accessing the mobile routing server via the roaming mobile network during the predetermined time period and based on the at least one of the URI and the destination IP address included in the metadata of the request, that the request is associated with a first gateway instead of a second gateway, the first gateway being a provider-charged gateway that is configured to provide access to the web content associated with the URL, the second gateway also being configured to provide access to the web content associated with the URL but not being a provider-charged gateway;
in response to determining that the request is associated with the first gateway:
instruct the mobile device to provide a notification to the end user that indicates that the at least the portion of the roaming data charges associated with the access of the web content by way of the mobile roaming network will be charged to an account associated with the content provider;
provide access to the web content associated with the URL via the first gateway; and
instruct the billing server to charge the account associated with the content provider for the at least the portion of the roaming data charges associated with the access to the web content by the mobile device that would have otherwise been charged to an account of the end user of the mobile device,
wherein the billing server charges, in response to the instructing of the billing server to charge the account associated with the content provider, the account associated with the content provider for the at least the portion of the roaming data charges associated with the access to the web content instead of the account of the end user of the mobile device.

12. The mobile routing server of claim 11, wherein:
the memory further comprises instructions which, when executed by the one or more processors, cause the one or more processors to:
receive an additional request from the mobile device, the additional request being entered by way of the user interface of the mobile device,
the additional request being associated with an additional URL for accessing web content provided by an additional content provider, and
the additional request including metadata that comprises at least one of an additional URI and an additional destination IP address;
determine, based on the at least one of the additional URI and the additional destination IP address included in the metadata of the additional request, that the additional request is not associated with the first gateway;
provide, in response to the determining that the additional request is not associated with the first gateway, access to the web content associated with the additional URL via the second gateway; and
instruct the billing server to charge the account of the end user of the mobile device for data charges associated with the access to the web content associated with the additional URL;

the first gateway includes a provider-charged Access Point Name (APN); and the second gateway includes a regular Internet gateway including a regular Internet APN different from the provider-charged APN.

13. The mobile routing server of claim 11, wherein the memory further comprises instructions which, when executed by the one or more processors, cause the one or more processors to process a registration, received from the content provider, for using the provider-charged gateway, wherein the registration indicates a billing policy for splitting the roaming data charges between the account associated with the content provider and the account of the end user of the mobile device.

14. The method of claim 1, wherein the account of the end user includes information defining how much the end user of the mobile device pays either for a data package associated with the mobile device or for each unit of data accessed by way of the mobile device.

* * * * *